United States Patent

[11] 3,545,431

[72] Inventors Ulrich A. Frank
Yardley, Pennsylvania;
Bernard C. Wollmeringer, Willingboro, New Jersey
[21] Appl. No. 737,949
[22] Filed June 18, 1968
[45] Patented Dec. 8, 1970
[73] Assignee Hoffmann-La Roche Inc.
Nutley, New Jersey
a corporation of New Jersey. by mesne assignments

[54] MONITORING DISPLAY
9 Claims, 2 Drawing Figs.
[52] U.S. Cl. .................................................... 128/2.05, 73/402
[51] Int. Cl. ................................................... A61b 5/02
[50] Field of Search .......................................... 128/2.05(AS), 2.05(D), 2.05(M), 2.05(MS), 2.05(SPH); 116/(Inquired); 73/389, 401, 402; 340/244

[56] References Cited
UNITED STATES PATENTS

| | | | |
|---|---|---|---|
| 2,352,875 | 7/1944 | Williams et al. | 128/2.05 |
| 2,821,188 | 1/1958 | Pigeon | 128/2.05 |
| 2,947,170 | 8/1960 | Quist | 73/401X |
| 3,023,622 | 3/1962 | Hezarifend | 73/401 |
| 3,056,401 | 10/1962 | Greenspan et al. | 128/2.05 |
| 3,202,148 | 8/1965 | London | 128/2.05 |
| 3,236,230 | 2/1966 | Follett | 128/2.05 |
| 3,456,648 | 7/1969 | Lee et al. | 128/2.05X |

*Primary Examiner*—William E. Kamm
*Attorneys*—Samuel L. Welt, Jon S. Saxe, Bernard S. Leon and Jacob Frank ABSTRACT: A monitoring display which provides a visual indication of the high and low systolic blood pressure alarm settings of a sphygmomanometer is accomplished by using two driven tapes, one overlapping the other alongside the manometer tube. The tape which is nearest the viewer has a transparent portion through which a portion of the second tape is viewable and has an opaque portion of one color which designates with respect to the manometer tube the high systolic pressure alarm region. The second or inner tape has an opaque portion of a color differing from the one color which relates with respect to the manometer tube and the first tape the permissible region of the systolic alarm settings. The second tape also has an opaque region of the one color which designates with respect to the manometer tube the low systolic alarm region. Movement of the tape nearest the viewer changes the viewable opaque portion of the first tape of the one color and correspondingly changes the high systolic alarm setting. The movement of the inner tape to change the viewable opaque portion of the inner tape of the same one color correspondingly changes the low systolic alarm setting.

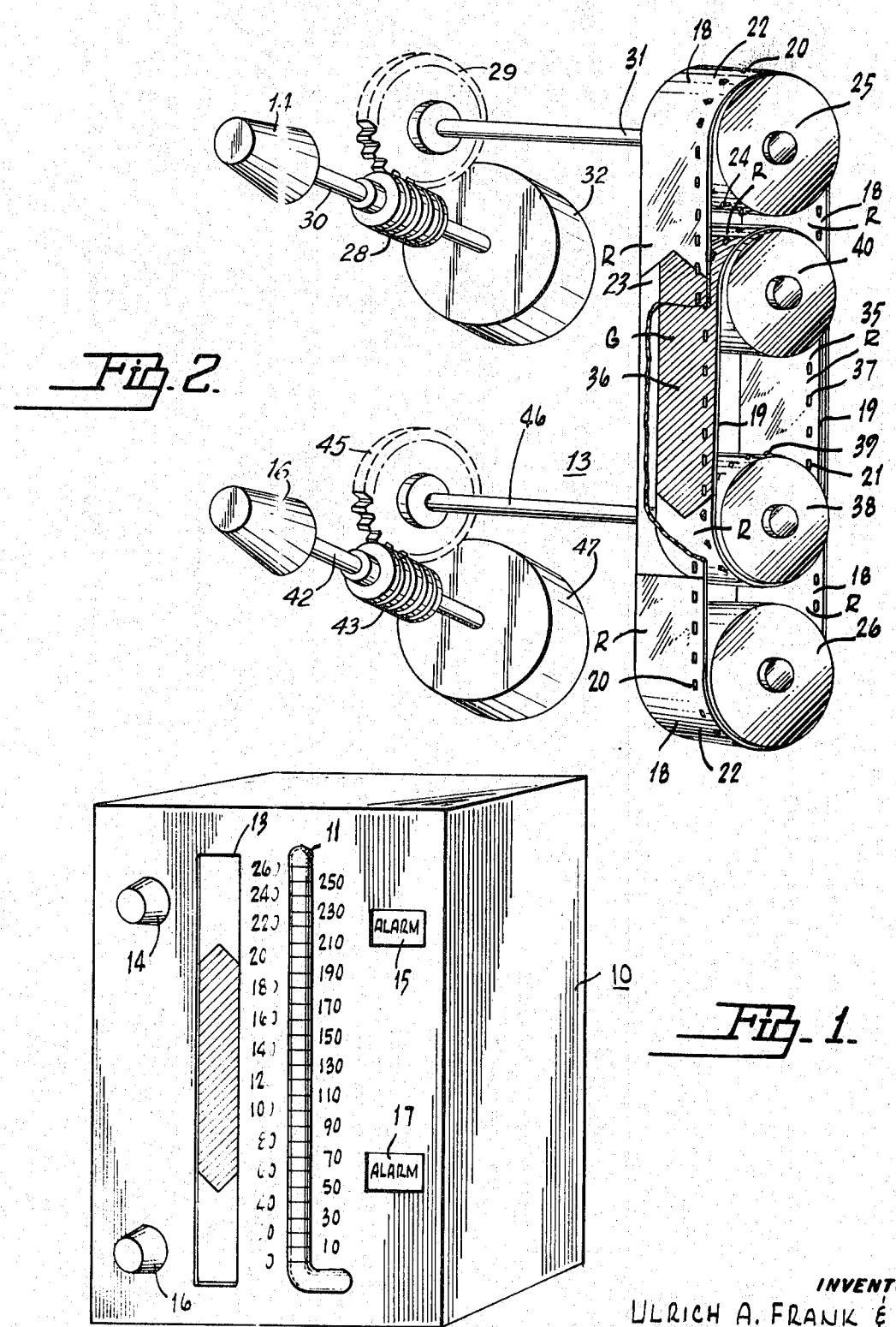

3,545,431

MONITORING DISPLAY

BACKGROUND OF THE INVENTION

This invention relates to a monitoring display in a sphygmomanometer for providing visual indication of the high and low systolic pressure alarm settings as selected by an attendant.

Automatic apparatus capable of measuring blood pressure (sphygmomanometer) finds particular importance in hospital operating rooms, hospital intensive care wards and in many experimental fields of medicine. Such an automatic apparatus should be one that can set off an alarm when the systolic blood pressure level is above or below certain limits. A sphygmomanometer should also provide a display that gives a visual indication of the selected high and selected low systolic pressure level alarm setting and which is readily seen when viewing the monitoring unit. There are several desirable requirements for this type of system. First, it is desirable that the monitoring display match with the manometer scale which is a traditional part of the system and as such provides a display to which physicians, nurses and other attendants are accustomed; secondly, it is desirable that the display immediately describe the permissible systolic pressures and the dangerous systolic pressures; thirdly, the display must tie in with the alarm potentiometer settings of the high and low systolic pressure alarm whereby the settings of the potentiometer cooperating with the monitoring display electrically determine when the alarm signal must be made; and fourthly, it is desirable that a reliable correlation of the actual pressure is indicated by the height of the mercury in the manometer tube and the limit set is indicated by the crossover between the permissible and the dangerous regions of the visible indicator.

It is an object of this invention to provide a monitoring display which provides a visual indication of the high and the low systolic pressure alarm settings alongside a manometer tube wherein the monitoring display matches the manometer scale and the alarm potentiometer setting cooperates with the monitoring display.

BRIEF DESCRIPTION OF THE INVENTION

In accordance with the present invention a monitoring display for the settings of the high and low systolic blood pressure alarm levels of a sphygmomanometer is provided which includes two movably mounted tapes with one of the tapes mounted forward of the second tape with respect to the viewable side of the display and with both tapes alined alongside the manometer tube of a sphygmomanometer. The outer of the two tapes has a transparent portion and an opaque portion. This forward tape is oriented and driven so that the viewable crossover at one end between the two portions of the outer tape is alined with the manometer tube pressure reading that corresponds to one of the two then selected systolic pressure level alarm settings. The inner of the two tapes has one portion the nature of which differs from the other portion. The inner tape is oriented and driven so that the viewable crossover of the inner tape between the two portions of the inner tape is alined with the manometer tube pressure reading that corresponds to the other of the two then selected systolic pressure level alarm settings.

DESCRIPTION OF A PREFERRED EMBODIMENT

The above-mentioned and other features and objects of this invention will become more apparent from the following description taken in connection with the accompanying drawing in which:

FIG. 1 is a sketch of a sphygmomanometer showing the viewable portion of the monitoring display means described in accordance with a preferred embodiment of this invention; and FIG. 2 is a sketch of the monitoring display means in accordance with a preferred embodiment of this invention.

Referring to FIG. 1, there is shown a sphygmomanometer (a blood pressure monitor) 10 having on its front face a manometer tube 11 and a monitoring display 13. Along the length of the manometer tube 11 there are located pressure readings wherein the height of the mercury in the tube indicates the pressure level both applied to the tube and around the limb of the human body (not shown). The high systolic alarm light indicator 15 is illuminated and other alarm indicators such as a bell (not shown) are activated when the patient's detected systolic blood pressure is above a given selected reading. The low systolic indicator light 17 is illuminated and other alarm indicators such as a bell (not shown) are activated when the patient's detected systolic blood pressure is below a certain selected reading. The patient's systolic blood pressure is normally determined, for example, by the placement of an inflatable cuff about the brachial artery (upper arm) and sufficient pressure is applied to the cuff to occlude the artery. As the pressure to the cuff rises, correspondingly the height of the mercury in the tube 11 rises. After the artery is occluded, so that no blood flows therethrough, the pressure is gradually drained off by a bleeder valve (not shown) to a point where it is detected that the blood begins to flow or the Korotkoff sound is detected. When this condition is determined, this indicates the systolic point of the patient's blood pressure. If this condition is detected when the pressure level in the tube and the cuff is above the high systolic alarm setting, the alarm indicator 15 will be illuminated and an alarm bell (not shown) will be energized to notify the attendant. If this condition is detected when the pressure level in the tube and the cuff is below the setting of the low systolic alarm, the low systolic alarm light 17 is illuminated and the low systolic alarm bell (not shown) is activated to warn the attendant.

In accordance with this invention, a monitoring display 13 is provided which is particularly adaptable for use with the manometer tube 11, the viewable portion of which is shown in FIG. 1 alongside the manometer tube 11. Display 13 is shown in more detail in FIG. 2. The monitoring display 13 includes two endless tapes 18 and 19 having apertures 20 and 21 respectively therein adapted to receive a sprocket. The first or outer tape 18 has, for example, a red opaque portion 22 marked R and a transparent portion 23. The transparent portion 23 is oriented generally in the forward center-viewing area at the front face of the sphygmomanometer 10 and relates to the permissible systolic region. The red opaque portion 22 marked R is oriented mostly near the ends of the viewing area and relates to the dangerous systolic region. The outer tape 18 is driven by a driver wheel 25 located near the top of the display 13. The driver wheel 25 has sprockets 24 thereon which extend through the apertures 20 when the tape is in place to move the tape to a desired position. The outer tape 18 is controlled and spaced along the display by an idler wheel 26 freely rotatable on its supporting shaft. Knob 14 on the front panel is coupled to a worm and gear mechanism including a worm 28 and gear 29 through shaft 30. Knob 14 is likewise coupled through shaft 30 to a potentiometer 32. Gear 29 is coupled to driver wheel 25 by means of a common shaft 31. As the shaft 30 is rotated by knob 14 to move drive wheel 25 and the tape 18, the setting of potentiometer 32 is changed to thereby change the setting of the alarm level of the high systolic pressure alarm. The second or inner tape 19 is mounted inside the outer tape 18. The center-viewing portion 36 of the second tape is, for example, green opaque marked G which relates generally to the permissible systolic region. The opaque portion 35 marked R of the tape 19 substantially on the opposite side from the center-viewing area is red opaque and relates generally to the dangerous systolic region. The tape 19 has apertures 37 therein and is driven by sprockets 39 on the driver wheel 38. Wheel 40 freely movable on its support shaft acts as the idler wheel to control the belt 19. Knob 16 on the front panel is coupled through shaft 42 to worm 43. Worm 43 is meshed with gear 45 with the gear 45 being coupled by shaft 46 to driver wheel 38. Knob 16 is likewise coupled by shaft 42 to potentiometer 47. Potentiometer 47 selects the alarm level of the low systolic alarm.

In operation, by the turning of knob 14, the outer belt 18 is turned so as to move more or less of the red opaque portion, dangerous systolic region of belt 18 near the top of the display 13 over the green opaque portion of tape 19, correspondingly changing the alarm setting of the high systolic alarm by the setting of the potentiometer 32. The V-shaped crossover border near the top of the display 13 between the red opaque portion or dangerous region and the green background seen through the transparent portion of tape 18 indicative of the permissive region is alined approximately with the corresponding level the mercury in the manometer tube must be when the high systolic alarm will begin to be energized and all pressure levels above this point will likewise provide an alarm. Similarly, when knob 16 on driver wheel 38 is turned causing tape 19 to move and provide a more or less red opaque area to be viewed near the bottom of the display 13, a corresponding change in the low systolic alarm setting is provided by the changing of the setting of potentiometer 47. The V-shaped crossover border near the bottom of the display 13 between the red opaque or dangerous region 35 marked R and the green opaque portion marked G or permissible region 36 of the tape 19 is alined approximately with the corresponding level the mercury in the manometer tube must be when the low systolic alarm will begin to be energized and all pressure levels below this level likewise provide an alarm.

In the above-described preferred embodiment, red opaque and green opaque taped are described. It is obvious that, without departing from the spirit of this invention other color tapes may be used and/or the second tape may have a screen green in color mounted behind both tapes to give an indication of the permissible region.

We claim:

1. A high and low systolic blood pressure alarm level-monitoring display for use in a sphygmomanometer having a manometer tube wherein the height of the mercury in the tube indicates by markings along said tube the blood pressure of a patient being monitored, comprising:

a first and second tape with the viewing area of said tapes being oriented alongside said manometer tube and said pressure level markings, said first tape having an opaque portion and a transparent portion wherein one of said portions relates to the permissible systolic region and the other portion relates to the dangerous region and wherein only one crossover between the permissible transparent region and the dangerous region is within the viewable area of said tape;

means for driving said first tape with said first tape being arranged so that said crossover of said first tape is alined with the pressure level marking along the manometer tube which corresponds with the then selected one of the systolic alarm levels;

said second tape having one portion the nature of which differs from the other portion wherein one of said portions of said second tape relates to the permissible systolic region and the other relates to the dangerous region and wherein only one crossover between the different regions of the second tape is within the viewable area of said second tape through said transparent portion of said first tape;

means for driving said second tape with said second tape being arranged so that said viewable crossover of said second tape is alined with the pressure level marking along the manometer tube which corresponds to the then selected other one of said systolic alarm levels.

2. The combination as claimed in claim 1 wherein said one of the selected alarm levels is said high systolic blood pressure alarm level and wherein said other one of said systolic alarm levels is said low systolic blood pressure alarm level.

3. The combination as claimed in claim 2 wherein said opaque portion of said first tape is red opaque and wherein one of said portions of said second tape is likewise red opaque.

4. The combination as claimed in claim 3 wherein there is provided a green opaque screen behind said second tape and the different portion of said second tape is transparent.

5. The combination as claimed in claim 3 wherein said different portion of said second tape is green opaque.

6. The combination as claimed in claim 5 wherein the crossover between the transparent and the red opaque portion of said first tape is a V-shaped border and wherein the border between the red and green opaque portion of said second tape is a V-shaped border.

7. The combination as claimed in claim 5 including a first and second potentiometer, said first potentiometer determining the high systolic alarm setting and said second potentiometer determining said low systolic alarm setting and wherein the means for driving said first tape is coupled to said first potentiometer and wherein the means for driving said second tape is coupled to said second potentiometer.

8. The combination as claimed in claim 7 wherein said means for driving said first tape includes a worm and gear mechanism and wherein said means for driving said second tape includes a worm and gear mechanism.

9. The combination as claimed in claim 7 wherein said first and second tapes are endless belt tapes with said second tape being positioned inside said first tape so that the amount of said green opaque and of said red opaque portions of said second tape viewable through said transparent portion of said first tape is determined by the setting of said driving means.

PO-1050
(5/69)

UNITED STATES PATENT OFFICE
CERTIFICATE OF CORRECTION

Patent No. 3,545,431      Dated December 8, 1970

Inventor(s) Frank and Wollmeringer

It is certified that error appears in the above-identified patent and that said Letters Patent are hereby corrected as shown below:

The serial number listed "737,949" should be 737,940

Column 4, line 13 in claim 1 "alined" should be aligned

Signed and sealed this 24th day of August 1971.

(SEAL)
Attest:

EDWARD M. FLETCHER, JR.      WILLIAM E. SCHUYLER, JR.
Attesting Officer      Commissioner of Patents